United States Patent
Geiger et al.

[11] Patent Number: 5,931,422
[45] Date of Patent: Aug. 3, 1999

[54] ACTIVE REINFORCED ELASTOMER SYSTEM

[75] Inventors: Michael Watson Geiger; Cynthia Ann Gruensfelder, both of St. Louis, Mo.; Jack Howard Jacobs, Glendale, Ariz.

[73] Assignee: McDonnell Douglas

[21] Appl. No.: 08/871,476

[22] Filed: Jun. 9, 1997

[51] Int. Cl.[6] ................ B64C 3/50; B64C 3/44
[52] U.S. Cl. .......................... 244/214; 244/219
[58] Field of Search ................. 244/215, 219, 244/75 R, 134 A, 214; 60/523

[56] References Cited

U.S. PATENT DOCUMENTS

| | | | |
|---|---|---|---|
| 2,973,170 | 2/1961 | Rodman | 244/123 |
| 3,893,639 | 7/1975 | Croswell, Jr. | 244/219 |
| 4,429,844 | 2/1984 | Brown et al. | 244/219 |
| 4,875,644 | 10/1989 | Adams et al. | 244/134 R |
| 5,150,864 | 9/1992 | Roglin et al. | 244/219 |
| 5,222,699 | 6/1993 | Albach et al. | 244/213 |
| 5,558,304 | 9/1996 | Adams | 244/134 A |
| 5,662,294 | 9/1997 | Maclean et al. | 244/219 |
| 5,686,003 | 11/1997 | Ingram et al. | 244/134 D |
| 5,752,672 | 5/1998 | McKillip, Jr. | 244/75 R |
| 5,794,893 | 8/1998 | Diller et al. | 244/219 |
| 5,803,405 | 9/1998 | Ellis et al. | 244/218 |
| 5,810,291 | 9/1998 | Geiger et al. | 244/133 |

OTHER PUBLICATIONS

C. R. Fuller, C. Guigou, and C. A. Gentry, *Foam–PVDF smart Skin For Active Control of Sound*, Apr. 1996, SPIE vol. 2721, pp. 26–37.

Hugh B. Denham, Todd A. Anderson, Erdogan Madenci and Paul Calvert, *Embedded PVF2 Sensors for Smart Composites*, 97, SPIE vol. 3040, pp. 138–143.

Darryll J. Pines, *Hybrid Ditributed Modal/Wave Sensors for Structural Control*, SPIE vol. 2717, pp. 462–471.

*Primary Examiner*—Charles T. Jordan
*Assistant Examiner*—Theresa M. Wesson
*Attorney, Agent, or Firm*—Dale B. Halling

[57] ABSTRACT

An active reinforced elastomer system (50) has a rigid attachment block (56). A stiffening member (58) slides through an opening in the rigid attachment block (56). A shape memory alloy structure (62) is attached to the rigid attachment block (56). An elastomer panel (52) is attached to the rigid attachment block (56) and covers the stiffening member (58).

20 Claims, 6 Drawing Sheets

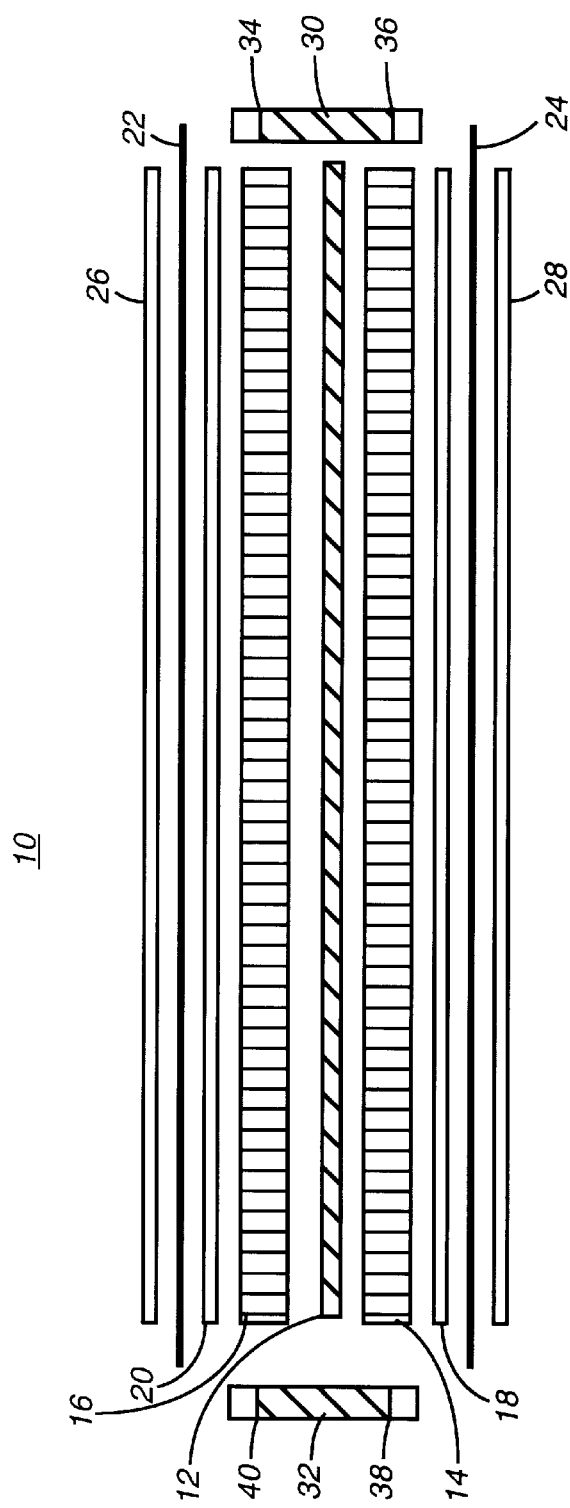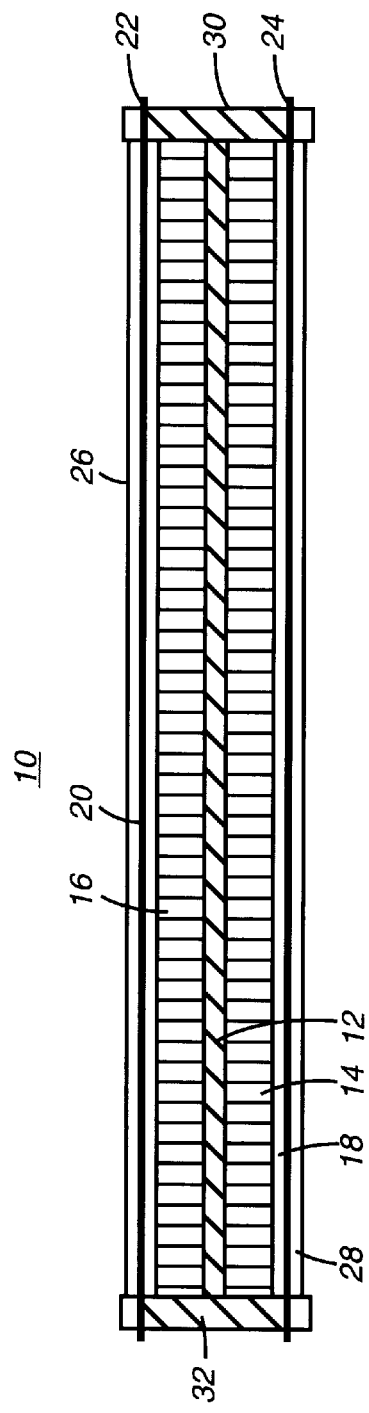

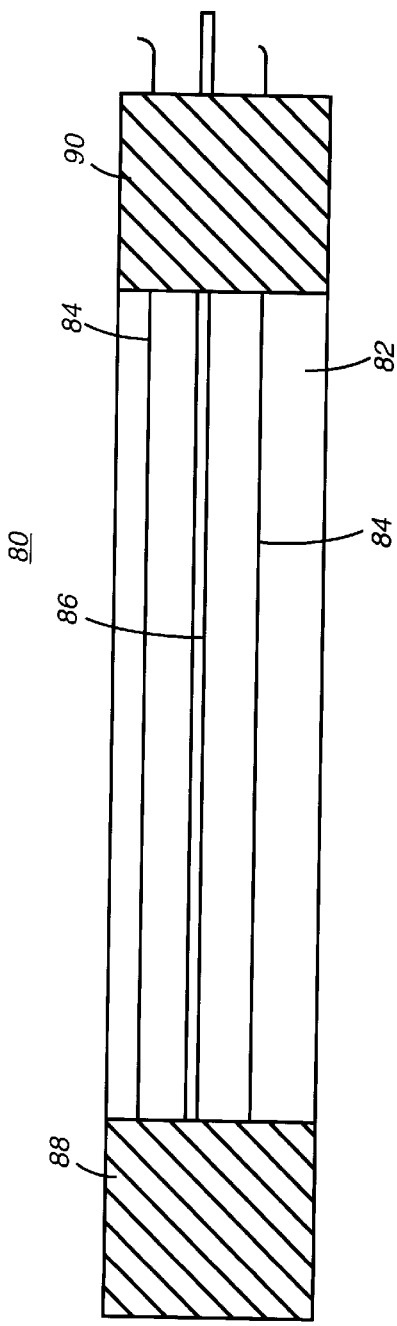
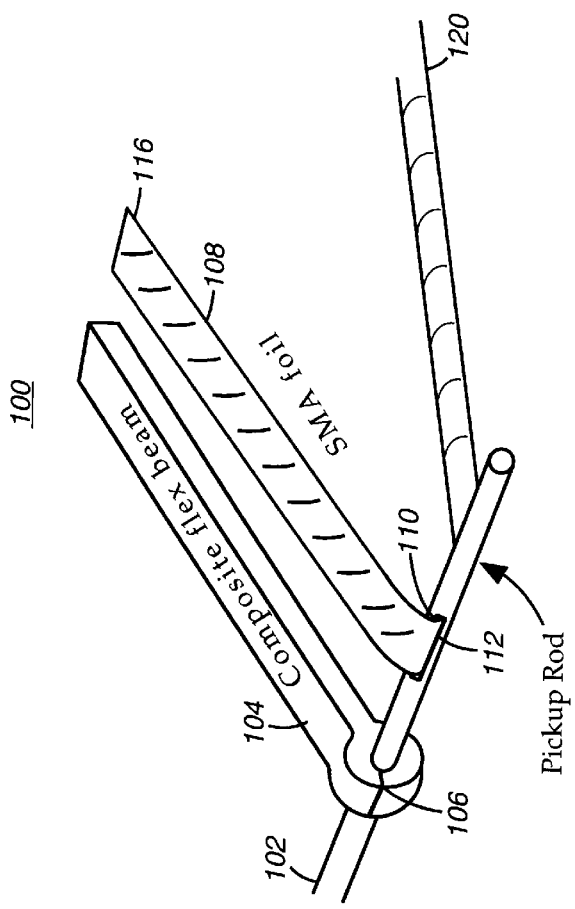

ACTIVE REINFORCED ELASTOMER SYSTEM

FIELD OF THE INVENTION

The present invention relates generally to the field of aircraft and more particularly to an active reinforced elastomer system.

BACKGROUND OF THE INVENTION

Shape memory alloys (SMA) have the unique property of changing modulus from around 4 to 13 MSI ($27.58 \times 10^9$ to $89.635 \times 10^9$ N/m$^2$) when heat or current is applied. The change in modulus is due to a phase transformation from the austenite to the martensite phase. Shape memory alloy is a nickel-titanium-copper alloy. Structures made out of shape memory alloy can change shape when the SMA is caused to change from a first state (austenite phase) to a second state (martensite). An SMA structure straightens and contracts when a current is applied. Unfortunately, very few practical SMA structures have been built, due in part to the fact that moderate heating activates the SMA structure. This makes the SMA structure difficult to work with in the manufacturing environment.

SUMMARY OF THE INVENTION

An active reinforced elastomer system has a rigid attachment block. A stiffening member slides through an opening in the rigid attachment block. A shape memory alloy structure is attached to the rigid attachment block. An elastomer panel is attached to the rigid attachment block and covers the stiffening member.

BRIEF DESCRIPTION OF THE DRAWINGS

FIG. 1 is an exploded side view of an embodiment of an active reinforced elastomer system;

FIG. 2 is a an assembled side view of the active reinforced elastomer system of FIG. 1;

FIG. 4 is a side view of an active reinforced elastomer system;

FIG. 5 is a perspective view of a portion of an embodiment of an active reinforced elastomer system;

DETAILED DESCRIPTION OF THE DRAWINGS

Figure 3:
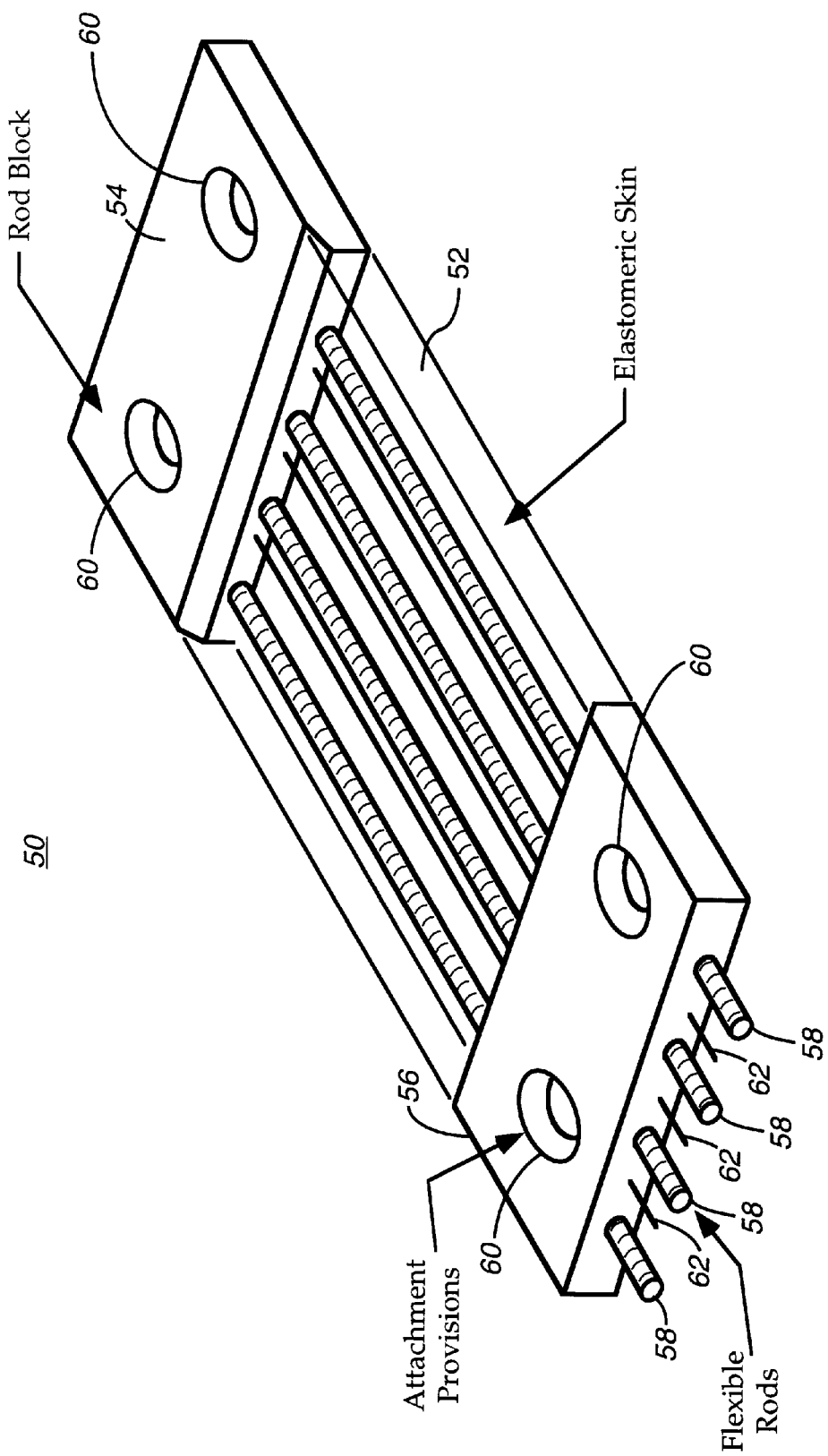
FIG. 3 is a perspective view of an embodiment of an active reinforced elastomer system.

FIG. 1 shows an exploded side view of an embodiment of an active reinforced elastomer system 10. A stiffening member (reinforcing member) 12 is sandwiched between two honeycomb composite sheets 14, 16. The stiffening member 12 can be a plurality of rods or a slat. The stiffening member 12 in one embodiment is a quartz epoxy composite. The honeycomb composite sheets 14, 16 are covered by an elastomer panel 18, 20. A shape memory alloy (SMA) structure 22, 24 is placed adjacent to the elastomer panel 18, 20. Then a second pair of elastomer panels 26, 28 are used to cover the shape memory alloy structures 22, 24.

The stiffening member 12 is attached to the rigid structures 30, 32. The SMA structures 22, 24 have leads that extend through openings 34–40 in the rigid structures (second rigid structure) 30, 32. This allows the SMA structures to be attached to a current source for activation. The pre-trained SMA structures are slipped inside a plastic sheath and then embedded between the two elastomer panels 20, 26–18, 28. The plastic sheath adheres to the elastomer panels, leaving the SMA structure free to slide within the sheath. The elastomer sheets 18, 20 are then bonded to the honeycomb composite sheets 14, 16 at a low temperature. The SMA structure cannot be pre-strained prior to the bonding because the temperature will activate the SMA structure. Prestraining the SMA will result in destroying the active reinforced elastomer system or destroying the tooling or both. Once the part is cured together, the SMA structures are pre-strained in a jig and then tied off to the rigid structures 30, 32. In one embodiment, the pre-strain is 3–4% strain. By applying current to the SMA structure 22, 24 shown in FIG. 2 it actively stiffens the active reinforced elastomer system 10.

The processes of encasing the SMA structure in a sheath and pre-straining the SMA structure after any heating is used in all the embodiments discussed herein. This process will not be described in conjunction with every embodiment.

In one embodiment the active reinforced elastomer system 10 used to cover a portion of an aircraft. When the system 10 is actively stiffened, it keeps the system 10 from flexing or bending. This prevents the system 10 from fluttering due to large pressure variations caused by turbulence.

FIG. 3 is a perspective view of an embodiment of an active reinforced elastomer system 50. An elastomer skin 52 is attached to a rigid attachment block 54 at a first end and attached to a second rigid attachment block 56 at a second end. A plurality of reinforcing members (flexible rods) 58 are attached to the rigid attachment block 54. The flexible rods 58 extend through the elastomer skin 52 and through an opening in the second rigid attachment block 56. The flexible rods 58 slide freely through the elastomer skin and the second rigid attachment block 56. The rigid attachment blocks 54, 56 have attachment provisions 60 for attaching the system 50 to an aircraft. A plurality of SMA structures 62 are attached to both rigid attachment blocks 54, 56.

The system 50 can be used to eliminate gaps in control surfaces and expandable bays on an aircraft. In addition, the system 50 can be used to create novel control surfaces for aircraft. When the rigid attachment blocks 54, 56 are attached to a rigid structure with a fixed distance between the blocks 54, 56, activating the SMA wires 62 results in stiffening the elastomer panel 52. When the blocks 54, 56 are attached to a structure with a movable distance between the blocks, activating the SMA wires can result in changing the shape of the elastomer panel 52 or actuating a mechanism.

FIG. 4 shows a side view of an active reinforced elastomer system 80. In this embodiment, an elastomer skin 82 encases a pair of SMA foils 84 and a stiffening slat 86. This embodiment is similar to the embodiment in FIG. 3 except the SMA structure is foil (or slat) instead of a wire and the reinforcing member 86 is a slat instead of a plurality of flexible rods. The stiffening slat 86 is attached to a rigid attachment block 88 and slides freely through an opening in a second rigid attachment block 90

Figure 6:
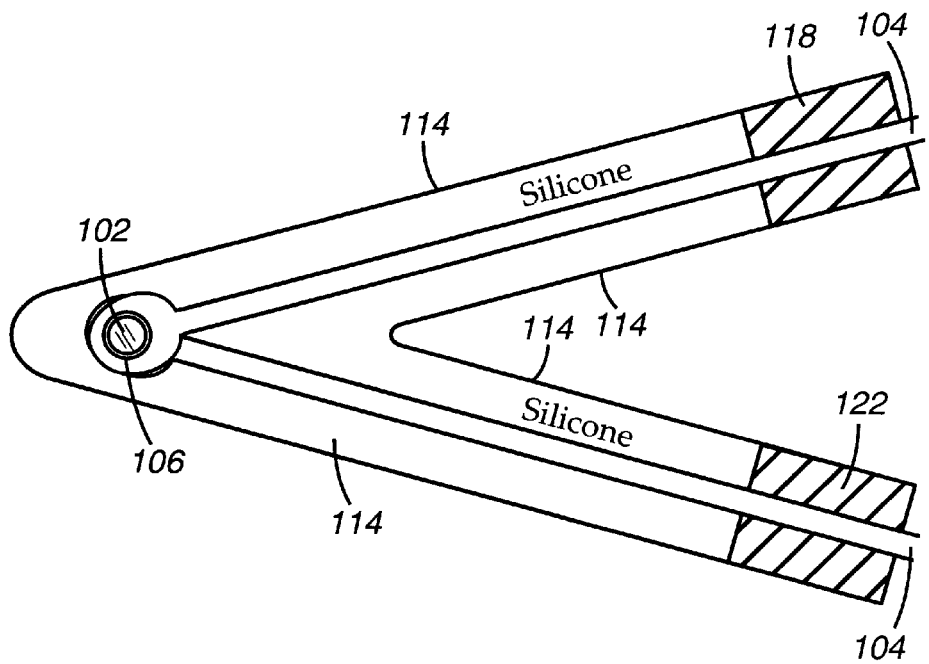
FIG. 6 is a side view of the active reinforced elastomer system of FIG. 5.
Figure 7:
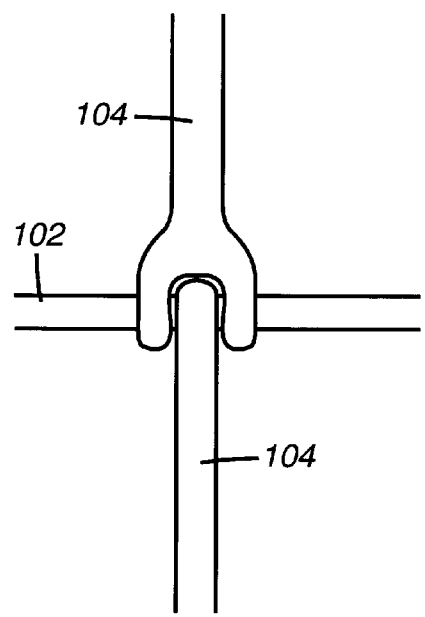
FIG. 7 is a front view of a portion of the active reinforced elastomer system of FIG. 5.

FIG. 5 shows a perspective view of a portion of an embodiment of an active reinforced elastomer system 100. This system 100 is designed to form an active leading edge of a wing for an aircraft. A pickup rod 102 has a plurality of reinforcing members 104 (only one is shown for clarity) pivotally attached. The pickup rod has an eyelet 106 that slides over the pickup rod 102. An SMA foil 108 or plurality of SMA foils 108 are coupled to the pickup rod 102. In one embodiment a center section 110 of the SMA foil fits in an opening 112 in the pickup rod 102. In another embodiment the composite beams 104 and SMA foils 108 fit alternately along the pickup rod 102. An elastomer cover 114 encases the SMA foils 108 and the composite reinforcing beams 104 as shown in FIG. 6. A first end of the SMA structure 116 attaches to a rigid block 118. A second end of the SMA structure 120 attaches to a second rigid block 122. A first subset of the plurality of reinforcing members 104 slide freely through the rigid block 118. A second subset of the plurality of reinforcing members 104 slide freely through the second rigid block 122. FIG. 7 shows an embodiment of how the reinforcing members 104 interlock on the pickup rod 102.

The system 100 forms the leading edge of a wing for an aircraft. The rigid blocks 118, 122 are attached to the skin of an aircraft. When the SMA foils are activated the pickup rod is pulled back towards the rigid blocks and the reinforcing rods (composite rod) slide into the rigid blocks to form a blunter leading edge shape.

Figure 8:
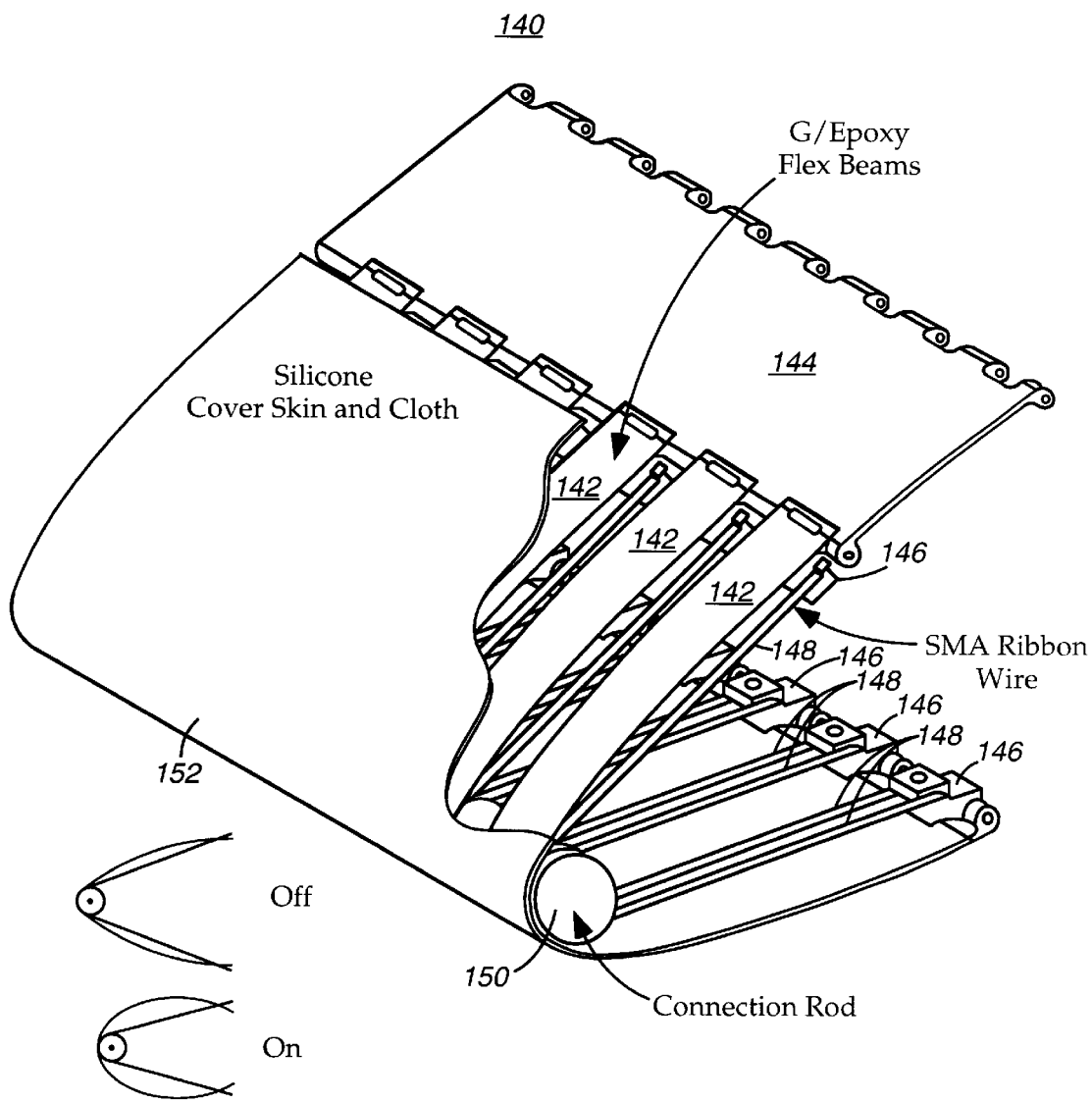
FIG. 8 is a partial cut away perspective view of an embodiment of an active reinforced elastomer system.
Figure 9:
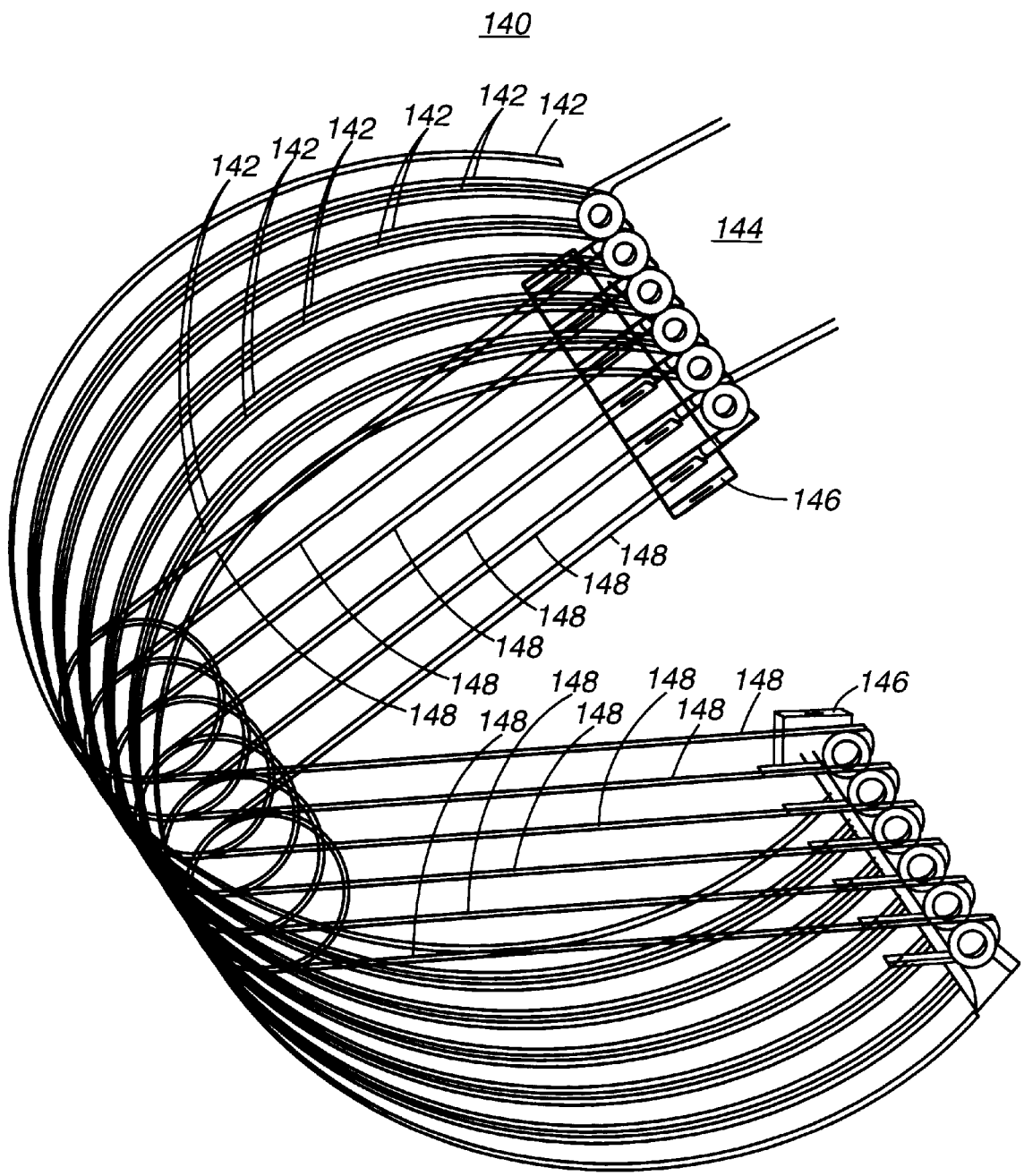
FIG. 9 is a perspective view of the active reinforced elastomer system of FIG. 8.

FIGS. 8 & 9 show another embodiment of the active reinforced elastomer system 140 used to form a leading edge. A plurality of composite flex beams 142 attach to a mounting plate 144. Mounting brackets 146 fit under the mounting plate 144. SMA wires 148 are attached to the mounting brackets 146 and fit over a pickup rod 150. When the SMA wires are in the first state a thin leading edge shape shown in FIG. 8 is formed. When the SMA wires are in a second state, (activated state) the pick-up rod 150 is pulled toward the mounting plates (rigid structure) 144 and the composite flex beams 142 bend to form a blunter leading edge, shown in FIG. 9. The outsides of the composite flex beams are covered with an elastomer skin 152.

In one embodiment the pick-up rod 150 contains a tube heater. This embodiment can be used as a novel deicing system, by placing the active reinforced elastomer system 140 along any leading edges requiring deicing. The tube heater activates the SMA wires 148 causing the leading edge to change shape and break any ice on the leading edge off. In addition, by placing the SMA wires near the surface, they provide heating to melt any snow or ice. A feedback sensor in the surface of the leading edge determines when the ice has been successfully removed.

The active reinforced elastomer system described above allows the aircraft designer to build new structures. The SMA allows the structures to be either actively stiffened or to change the shape of the structure. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An active reinforced elastomer system for use in an aircraft comprising:
   a rigid attachment block;
   a stiffening member sliding through an opening in the rigid attachment block;
   a shape memory alloy structure attached to the rigid attachment block; and
   an elastomer panel attached to the rigid attachment block and covering the stiffening member.

2. The active reinforced elastomer system of claim 1, further including a second rigid attachment block attached to the stiffening member.

3. The active reinforced elastomer system of claim 1, further including a pickup rod pivotally attached to the stiffening member.

4. The active reinforced elastomer system of claim 1, wherein the stiffening member is a composite beam.

5. The active reinforced elastomer system of claim 1, wherein the shape memory alloy structure is a foil.

6. The active reinforced elastomer system of claim 1, wherein the shape memory alloy structure is encased in a sheath.

7. The active reinforced elastomer system of claim 6, wherein the sheath is plastic.

8. An active reinforced elastomer system for use in aircraft comprising:
   a pickup rod;
   a plurality of reinforcing members pivotally attached to the pickup rod;
   a shape memory alloy structure having a center section coupled to the pickup rod;
   a rigid block attached to a first end of the shape memory alloy structure;
   a second rigid block attach to a second end of the shape memory alloy structure; and
   an elastomer cover attached to the rigid block and the second rigid block.

9. The active reinforced elastomer system of claim 8, wherein the shape memory alloy structure has a first state and a second state.

10. The active reinforced elastomer system of claim 8, wherein the shape memory alloy structure is encased in a sheath.

11. The active reinforced elastomer system of claim 8, further including a plurality shape memory alloy structures coupled to the pickup rod.

12. The active reinforced elastomer system of claim 8, wherein a first subset of the plurality of reinforcing members have a first end extending through the rigid block.

13. The active reinforced elastomer system of claim 12, wherein a second subset of the plurality of reinforcing members have a first end extending through the second rigid block.

14. The active reinforced elastomer system of claim 8, wherein the plurality of reinforcing members have an eyelet at a second end, the eyelet sliding over the pickup rod.

15. An active reinforced elastomer system for use in an aircraft comprising:
   a rigid structure;
   a reinforcing member attached to the rigid structure;
   a shape memory alloy structure attached to the rigid structure; and
   a elastomer sheet covering the reinforcing member and the shape memory alloy structure.

16. The active reinforced elastomer system of claim 15, further including a honeycomb composite sheet adjacent to the reinforcing member and attached to the rigid structure.

17. The active reinforced elastomer system of claim 15, wherein the shape memory alloy structure is encased in a sheath.

18. The active reinforced elastomer system of claim 15, further including a second rigid structure attached to the reinforcing member.

19. The active reinforced elastomer system of claim 15, wherein the reinforcing member is a composite rod.

20. The active reinforced elastomer system of claim 15, wherein the reinforcing member is a slat.

* * * * *